(12) United States Patent
Bates et al.

(10) Patent No.: US 7,647,483 B2
(45) Date of Patent: Jan. 12, 2010

(54) MULTI-THREADED PARALLEL PROCESSOR METHODS AND APPARATUS

(75) Inventors: John P. Bates, Redwood City, CA (US); Attila Vass, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 284 days.

(21) Appl. No.: 11/676,837

(22) Filed: Feb. 20, 2007

(65) Prior Publication Data

US 2008/0201561 A1 Aug. 21, 2008

(51) Int. Cl.
*G06F 9/48* (2006.01)
(52) U.S. Cl. ........................ 712/220; 712/228
(58) Field of Classification Search .................. 712/220
See application file for complete search history.

(56) References Cited

U.S. PATENT DOCUMENTS

| 6,078,994 | A  * | 6/2000 | Carey ........................ 711/133 |
| 6,341,347 | B1 * | 1/2002 | Joy et al. .................... 712/228 |
| 6,934,950 | B1 * | 8/2005 | Tuel et al. ................... 718/102 |
| 7,062,606 | B2 * | 6/2006 | Ober et al. ................... 711/121 |
| 2005/0188372 | A1 | 8/2005 | Inoue et al. ................. 718/100 |
| 2005/0188373 | A1 | 8/2005 | Inoue et al. ................. 718/100 |
| 2006/0031836 | A1 * | 2/2006 | Brown et al. ................ 718/100 |
| 2006/0069878 | A1 * | 3/2006 | Aguilar et al. .............. 711/147 |
| 2006/0095901 | A1 * | 5/2006 | Brokenshire et al. ........ 717/151 |
| 2006/0190942 | A1 | 8/2006 | Inoue et al. ................. 718/100 |
| 2007/0074206 | A1 | 3/2007 | Iwamoto ........................ 718/1 |
| 2007/0074207 | A1 | 3/2007 | Bates et al. .................... 718/1 |
| 2007/0074212 | A1 | 3/2007 | Bates et al. ................. 718/100 |
| 2007/0074221 | A1 | 3/2007 | Stenson et al. .............. 718/106 |
| 2007/0083755 | A1 | 4/2007 | Iwamoto ..................... 713/164 |

FOREIGN PATENT DOCUMENTS

| JP | 2007052511 | 3/2007 |
| WO | WO2007020739 | 2/2007 |

OTHER PUBLICATIONS

Maedo, S et al., A Real-Time Software Platform for the Cell Processor, 2005, IEEE, pp. 20-29.*

(Continued)

*Primary Examiner*—Eric Coleman
(74) *Attorney, Agent, or Firm*—Joshua D. Isenberg; JDI Patent (57) ABSTRACT

A processor system and a processor readable medium, which implement a method for implementing multiple contexts on one or more SPE are disclosed. Code and/or data for a first and second contexts may be respectively stored simultaneously in first and second regions of an SPE's local memory, storing code and/or data for a second context in a second region of the local memory, the SPE may execute the first context while the second context waits. Code and/or data for the first context may be transferred from the first region to the second and code and/or data for the second context may be transferred from the second region to the first, and the SPE may execute the second context during a pause or stoppage of execution of the first context. Alternatively, the code and/or data for the second context may be transferred to another SPE's local memory.

28 Claims, 6 Drawing Sheets

OTHER PUBLICATIONS

Ohara, M. etal., MPI microtask for programming the Cell Broadband Engine processor, 2006, IBM, IBM Systems Journal, vol. 45, No. 1, pp. 85-102.*

U.S. Appl. No. 11/238,085 entitled "Method and System for Performing Memory Copy Function on a Cell Processor" to Antoine Labour et al, filed Sep. 27, 2005.

U.S. Appl. No. 11/461,390 entitled "Cell Processor Methods and Apparatus" to John P. Bates et al, filed Jul. 31, 2006.

U.S. Appl. No. 60/650,153 entitled "Processor Task Migration Over a Network in a Multi-Processor System" to Keisuke Inoue et al, filed Feb. 4, 2005. This reference is believed cumulative of the Patent Application Publication No. 20060190942.

Sony Computer Entertainment Incorporated, Toshiba Corporation 2005 "Cell Broadband Engine Architecture" Aug. 8, 2005, Version 1.0.

* cited by examiner

SPMM

FIG. 3C

SPMM with SPURS Policy

FIG. 3D

SPMM with STM Policy

FIG. 3E

SPMM with CTDM Policy

MULTI-THREADED PARALLEL PROCESSOR METHODS AND APPARATUS

FIELD OF THE INVENTION

This invention generally relates to parallel processing and more particularly to multi-threaded operation in parallel processors such as cell processors.

BACKGROUND OF THE INVENTION

A major advance in electronic computation has been the development of systems that can perform multiple operations simultaneously. Such systems are said to perform parallel processing. Recently, cell processors have been developed to implement parallel processing on electronic devices ranging from handheld game devices to main frame computers. A typical cell processor has a main memory, power processor element (PPE) and up to 8 additional processor elements referred to as synergistic processing elements (SPE). Each SPE is typically a single chip or part of a single chip containing a processor known as a synergistic processor unit (SPU) and a local memory. All of the SPEs and the PPE can access the main memory, e.g., through a memory flow controller (MFC). The SPEs can perform parallel processing of operations in conjunction with a program running on the main processor. The local memory associated with each SPU is relatively small, currently about 256 kilobytes in one common implementation. This memory must be managed by software to transfer code and data to/from the local SPE memories.

The SPE have a number of advantages in parallel processing applications. For example, the SPE are independent processors that can execute code with minimal involvement from the PPE. Each SPE has a high direct memory access (DMA) bandwidth to RAM. An SPE can typically access the main memory faster than the PPE. In addition each SPE has relatively fast access to its associated local store. The SPE also have limitations that can make it difficult to optimize SPE processing. For example, the SPE have no coherent memory and no hardware cache. In addition, common programming models do not work well on SPE.

A typical SPE process involves retrieving code and/or data from the main memory, executing the code on the SPU to manipulate the data, and outputting the data to main memory or, in some cases, another SPU. To achieve high SPU performance it is desirable to optimize the above SPU process in relatively complex processing applications. For example, in applications such as computer graphics processing SPUs typically execute tasks thousands of times per frame.

One prior art task management system used for cell processors is based on a software concept referred to as "threads". A "thread" generally refers to a part of a program that can execute independently of other parts. Operating systems that support multithreading enable programmers to design programs whose threaded parts can execute concurrently. When a thread is interrupted, a context switch may swap out the contents of an SPE's local storage to the main memory and substitute 256 kilobytes of data and/or code into the local storage from the main memory where the substitute data and code are processed by the SPU. A context switch is the computing process of storing and restoring the state of a SPE or PPE (the context) such that multiple processes can share a single resource.

A typical context switch involves stopping a program running on a processor and storing the values of the registers, program counter plus any other operating system specific data that may be necessary to the main memory. For example, to prevent a single process from monopolizing use of a processor certain parallel processor programs perform a timer tick at intervals ranging from about 60 ticks per second to about 100 ticks per second. If the process running on the processor is not completed a context switch is performed to save the state of the processor and a new process (often the task scheduler or "kernel") is swapped in. As used herein, the kernel refers to a central module of the operating system for the parallel processor. The kernel is typically the part of the operating system that loads first, and it remains in main memory. Typically, the kernel is responsible for memory management, process and task management.

Frequent context switches can be quite computationally intensive and time consuming, particularly for processors that have a lot of registers. As used herein, a register refers to a special, high-speed storage area within a processor. Typically, data must be represented in a register before it can be processed. For example, if two numbers are to be multiplied, both numbers must be in registers, and the result is also placed in a register. The register may alternatively contain the address of a memory location where data is to be stored rather than the actual data itself. Registers are particularly advantageous in that they can typically be accessed in a single cycle. Program compilers typically make use of as many software-configurable registers as are available when compiling a program.

One prior art task management system used for cell processors is known as SPU Threads. A "thread" generally refers to a part of a program that can execute independently of other parts.

Operating systems that support multithreading enable programmers to design programs whose threaded parts can execute concurrently. SPU Threads operates by regarding the SPUs in a cell as processors for threads. A context switch may swap out the contents of an SPU's local storage to the main memory and substitute 256 kilobytes of data and/or code into the local storage from the main memory where the substitute data and code are processed by the SPU. A context switch is the computing process of storing and restoring the state of a SPU or PPE (the context) such that multiple processes can share a single resource. Context switches are usually computationally intensive and much of the design of operating systems is to optimize the use of context switches.

Unfortunately, interoperating with SPU Threads is not an option for high-performance applications. Applications based on SPU Threads have large bandwidth requirements and are processed from the PPE. Consequently SPU-threads based applications are not autonomous and tend to be slow. Because SPU Threads are managed from the PPE, SPU context switching (swapping out the current running process on an SPU to another waiting process) takes too long. Avoiding PPE involvement in SPU management can lead to much better performance for certain applications.

To overcome these problems a system referred to as SPU Runtime System (SPURS) was developed. In SPURS, the memory of each SPU has loaded into it a kernel that performs scheduling of tasks handled by the SPU. Groups of these tasks are referred to as Tasksets. SPURS is described in PCT Application, PCT/JP2006/310907, to Keisuke Inoue and Seiji Murata filed May 31, 2006 entitled "METHOD AND APPARATUS FOR SCHEDULING IN A MULTI-PROCESSOR SYSTEM", and in US Patent Application Publication No. 20050188373, to Keisuke Inoue, Tatsuya Iwamoto and Masahiro Yasue, Filed Feb. 20, 2004 and entitled "METHOD AND APPARATUS FOR TASK MANAGEMENT IN A MULTI-PROCESSOR SYSTEM", and in US Patent Application Publication No. 20050188372 to Keisuke Inoue and Tatsuya Iwamoto filed Feb. 20, 2004 and entitled "METHOD AND APPARATUS FOR PROCESSOR TASK MIGRATION IN A MULTI-PROCESSOR SYSTEM" and in U.S. Provisional Patent Application No. 60/650,153 to Keisuke Inoue and Masahiro Yasue, filed Feb. 4, 2005 and entitled "PROCESSOR TASK MIGRATION OVER A NETWORK IN A MULTI-PROCESSOR SYSTEM", the disclosures of all four of which are incorporated herein by reference.

It is within this context that embodiments of the present invention arise.

BRIEF DESCRIPTION OF THE DRAWINGS

Embodiments of the present invention may be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

In embodiments of the present invention, the local memory of a synergistic processor unit may be divided into two or more independent sections. The context, e.g., the code, data and stack, of a running thread may reside in each section. When execution of a given resident thread pauses or is stopped, e.g., at the start of a blocking I/O DMA, the SPE may resume execution of another resident thread. Alternatively, a non-running thread resident on the SPE may be transferred to another SPE for execution when that SPE becomes available. A simple scheduler resident on the SPE may be used to keep track of resident tasks, similar to the SPURS Task model described above. In contrast to the SPURS Task model, multiple task contexts may be resident simultaneously on the same SPE. When executing a blocking call, another resident task can be immediately jumped to with lower latency because the task's context does not have to be DMA'd to the SPE local memory from a main memory, e.g., one that is shared by multiple SPE and/or a PPE.

When multiple SPE are involved with the same set of tasks, a scheduler program resident on each SPE can decide whether to swap out a task during a blocking operation or to keep it resident while executing another resident task. The criteria for this decision may be based on how much time the blocking operation of the current task will take. For example, if the blocking operation is short term, the task may benefit from staying resident. While a task is resident on one SPE, it can not be executed by another SPE. When a task yields control to the scheduler, the SPE registers may be saved to a reserved area in the SPE local memory. Separate register areas 113A, 113B may be reserved in the local memories of each SPE for each thread resident on the SPE, as indicated in FIG. 1B.

Figure 1A:
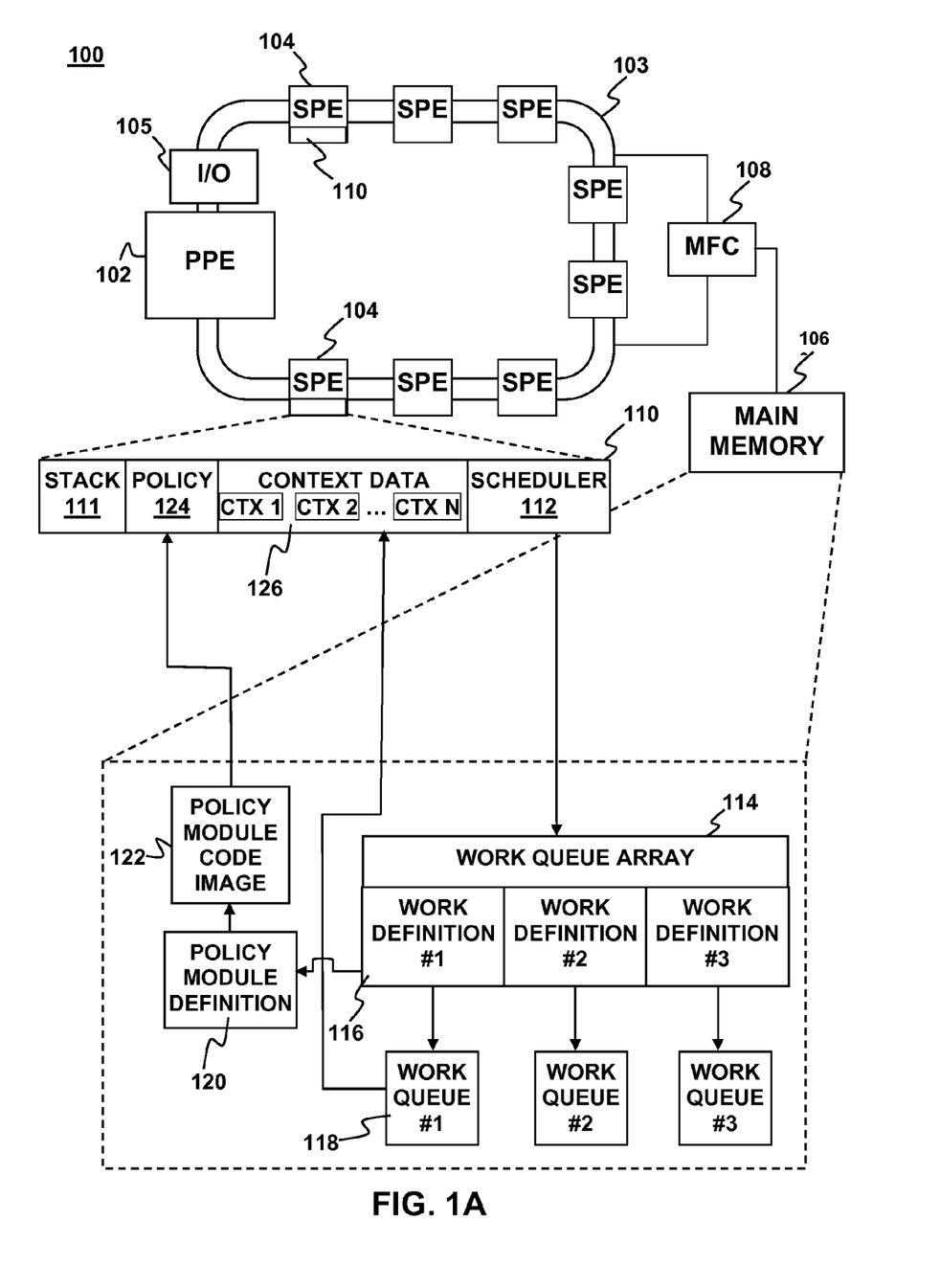
FIGS. 1A-1B are schematic diagrams of cell processors according to embodiments of the present invention.
Figure 1B:
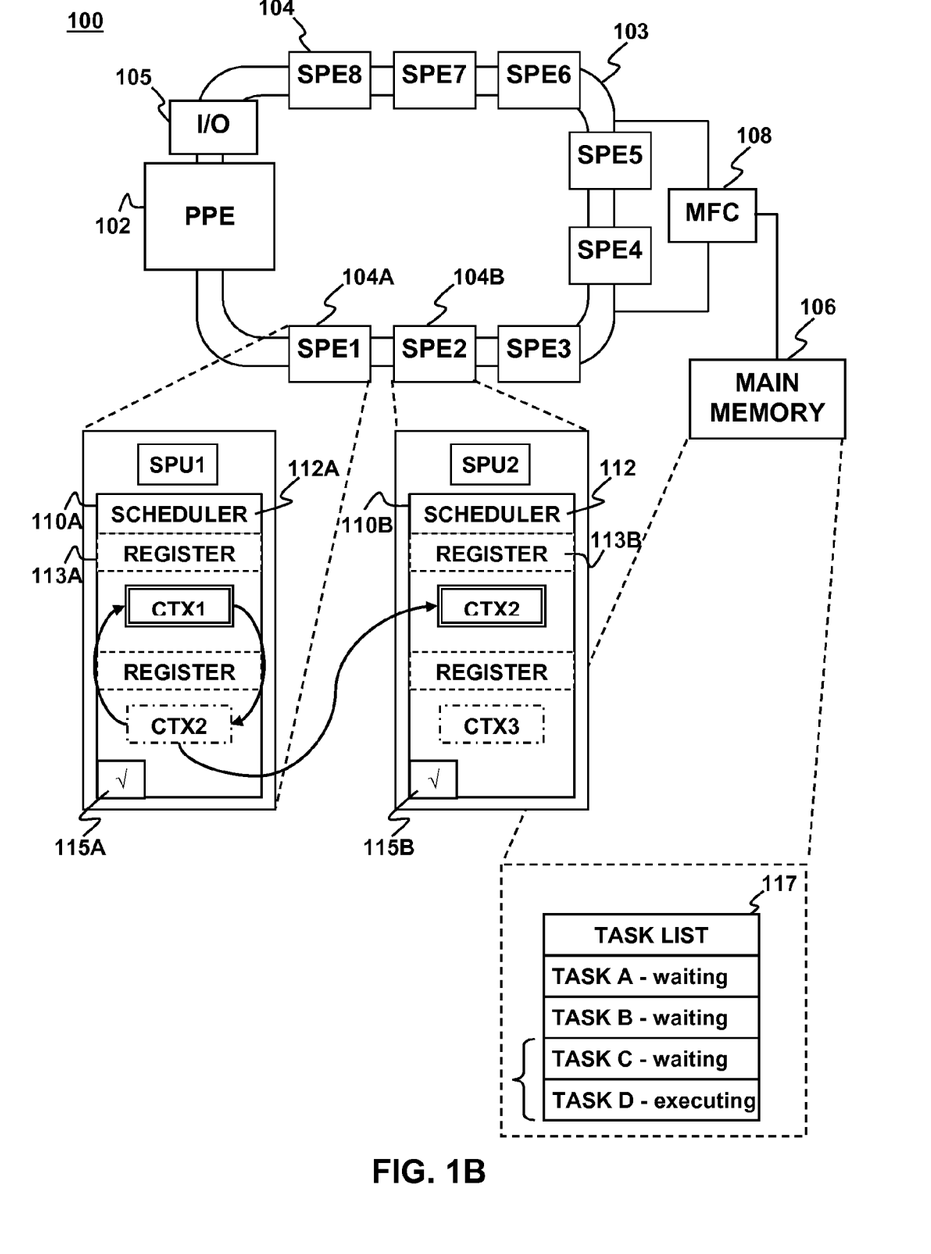

FIG. 1A and FIG. 1B are schematic depictions of a cell processor 100. According to an embodiment of the present invention, the cell processor 100 generally includes a power processor element (PPE) 102 and several synergistic processing elements (SPE) 104. In FIG. 1, a single PPE 102 and eight SPE 104 are shown for the sake of example. Cell processors having two or more PPE and a greater or lesser number of SPE may be used in conjunction with embodiments of the present invention.

The PPE 102 acts as a controller for the SPE 104, which handle most of the computational workload. The PPE 102 may also be used to run conventional operating systems if it is sufficiently similar to other 64-bit PowerPC processors, and if the SPE 104 are designed for vectorized floating point code execution. By way of example, the PPE 102 may contain a 32 kilobyte instruction and data Level 1 cache and a 512 kilobyte Level 2 cache.

The PPE 102 and SPE 104 can exchange code and data with each other over an exchange interface bus (EIB) 103. The PPE 102 and SPE 104 can also exchange code and data stored in a main memory 106, e.g., via an element interface bus (EIB) 103 and a memory flow controller (MFC) 108 such as a digital memory access (DMA) unit or the like. The EIB 103 may be a circular bus having two channels in opposite directions. The EIB 103 may also be connected to the Level 2 cache, the MFC 108, and a system interface 105 such as a FlexIO for external communications.

Each SPE 104 includes a processor, sometimes known as a synergistic processor unit (SPU) and a local memory 110. Code and data obtained from the main memory 106 can be loaded into the local memory 110 so that the SPE 104 can process tasks. The local memory 110 may include a stack 111 to facilitate processing of tasks. As used herein and as is generally known, the term "stack" generally refers to a type of data structure in which items of data are removed in the reverse order from that in which they are added, so that the most recently added item is the first one removed. Such a structure is also sometimes known as a last-in, first-out (LIFO).

The SPE 104 may have a number of features that are different from conventional processors such as the PPE 102. For example, a conventional processor allows code to address a large memory space, and transparently caches the memory to the processor's smaller cache memory. Unlike conventional processors such as the PPE 102, an SPE 104 generally lacks a cache hierarchy. The lack of a cache hierarchy makes throughput to the main memory 106 much faster for an SPE 104 than for a conventional processor. Access to the local memory 110 may be even faster as long as the SPE 104 has been explicitly programmed to DMA data to or from the local memory 110.

In some embodiments, the local memory 110 of each SPE 104 may contain a software scheduler program 112. Preferably, the scheduler program 112 takes up only a small fraction of the total memory space available in each local memory 110 (e.g., less than about 1% of each SPE local memory). The heart of the scheduler program 112 is referred to as a "Kernel", which may take up as little as about 2 KB resident on each SPU. For a 256K local memory, this represents about 0.8% SPU Local Store usage.

Context data 126 relating to two or more contexts CTX 1, CTX 2, . . . CTX N may be resident in one local memory 110 for the same SPE 104. The context data 126 may include both code and data relating to the contexts CTX 1, CTX 2, . . . CTX N. The scheduler program 112 may be configured to perform a direct SPE context switch between two different contexts that are resident on the same SPE 104 or to perform a direct SPE context switch between one context resident on one SPE and another context that is resident on a different SPE in the cell processor 100. As used herein a "direct SPE context switch" refers to a context switch involving transfer of context data among one or more SPE local memories without having to store or retrieve any context data from a memory that is shared among the SPE, e.g., main memory 106. Because data transfer within and among the SPE in the cell processor 100 may be much faster than data transfer to or from main memory 106 the use of direct SPE context switches may greatly enhance parallel processing performance.

A simple requirement for direct SPE context switches is that code and/or data for two or more contests fit in the local memory 110. This is largely a matter of making sure that either the available local memory space is large enough or the context data 126 is small enough. Increasing the memory space available, though perhaps non-trivial, is relatively straightforward. For example, adjustments in cell processor chip layout may allow allocation of more space on a cell chip for larger sized local memory. Alternatively, the density of memory storage space per unit area may be increased through advances in semiconductor processing. In certain Cell processor implementations, the current local memory size is 256KB. However, future Cell revisions may have larger local memory sizes such as 512KB or even 1MB, allowing for either more resident threads, or more per-thread memory.

The scheduler program 112 may be configured to manage policy modules 124 one or more which may be loaded into the local memory 110 along with the context data 126. As used herein, "Policy Module" refers to a small manager object on an SPE that defines a programming model and task execution scheme. A policy module may be implemented as an SPU-readable binary code for processing Work Queues 118. The software development kit (SDK) for a given application implemented in accordance with embodiments of the present invention may use different policies depending how a given work queue is to be implemented. For example one policy may be used for multi-tasking and another policy may be used for job streaming. Job streaming is a popular term for the STM processing model. A given Policy Module can manage code and/or data in the remaining SPE memory to execute SPE work. Policy Modules may be transferred from main RAM to SPE local memory to execute as needed by the current Work Queue. Other schemes of transferring a Policy Module from one SPE to another are also recognized by the present inventors. By way of example manager program kernel may choose a new Work Queue every time it runs.

As used herein, the term "Work Queue" (sometimes also called a "Work Load") refers to work defined at some location in a memory, such as, SPE work defined in main memory 106. This is often a queue of task definitions; however other arrangements of work definitions may be used. A Policy Module associated with the work-queue determines how this work is interpreted and executed. Thus, the policy module interprets the Work Queue 118. A Work Queue is usually a group of tasks or jobs that can be processed by multiple SPUs. SPURS Tasksets or SPU Task Management (STM) job lists are examples of Workloads.

In some embodiments, the Kernel of the scheduler program 112 may provide priority-based Work Queue scheduling. There are a number of different ways of prioritizing work in a work queue 118. Various examples of work queue prioritization hierarchies are described, e.g., in commonly-assigned U.S. patent application Ser. No. 11/461,390, to John P. Bates et al, filed Jul. 31, 2006 and entitled "CELL PROCESSOR METHODS AND APPARATUS".

The scheduler program 112 may implement a simplest set of features to enable scheduling of SPE work. In such cases, Policy Modules may manage their own context data. Policy Modules may determine their context data, e.g., from a pointer to SPE work. A Policy Module image may be preprocessed with state data. The Policy Module may be stored as an Executable and Linkable Format (ELF) image. After an ELF has been processed and linked to an image that image is ready to execute. For example, certain global data may be initialized in the ELF image based on runtime options. During execution of a Policy Module, state data may be changed by an SPE and passed from a Policy Module running in the SPE to main memory. The PPE may also change the state of state data in a Policy Module.

By way of example, policy modules and work queues may be associated as follows. As shown in the lower inset in FIG. 1A, the main memory 106 may contain a work queue array 114 having a set of work definitions 116. The work queue array may include any number of work definitions 116 for any number of corresponding work queues 118. The number of work queues that the work queue array 114 can accommodate may depend on the availability for processing the work queues. In some embodiments the work queues 118 may be very efficiently scheduled amongst the SPUs 104 if there are definitions for sixteen work queues in the work queue array 114. Scheduling of sixteen work queues may be particularly efficient, e.g., where the scheduler program 112 has a limited amount of overhead, e.g., about 2 kilobytes and the cell processor 100 has eight SPUs.

Table I illustrates an example of a data structure for a work definition 116 stored in the work queue array 114.

TABLE I

| Bytes (13) | Work Definition |
|---|---|
| 4 | Memory address of Work |
| 4 | Memory address of Policy Module Definition |
| 1 | Priority |
| 1 | Contention (Number of SPUs) |
| 1 | Maximum Allowed Contention |
| 1 | Minimum Contention |
| 1 | State |

Table I represents one possible work definition, among others. The particular contents of work definitions data structures may vary from that of Table I. In general, each of the work definitions 116 includes a pointer to a memory address for the corresponding work queue (WQ) 118. The memory address includes SPE work defined in RAM, which may contain both code and data for the work queue 118. Examples of work queues include tasks, characterized e.g., Tasksets, or Task Queues and jobs characterized by job chains. Both tasks and jobs may contain code and/or data associated with performing associated work. Tasks may be distinguished from jobs as follows. As used herein, a task refers to work that is similar to a thread in that it has an associated context. As such, a task can be swapped in and out of an SPU at some intermediate stage of completion. A job, by contrast, has no associated context. Consequently, a job runs complete, i.e., once an SPU starts working on a job, the SPU runs until the job is complete. The data associated with a job may define how much space in SPU local memory 110 is needed to complete the job.

The Work Queue definition 116 may also include a value for the state of the corresponding WQ 118. Work Queue states can be set from either the PPE 102 or SPU 104. Examples of states include (a) SPM_READY—which means that the WQ 118 contains ready work, (b) SPM_EMPTY—WQ, which means that the WQ 118 contains no ready work and (c) SPM_FREE—WQ, which means that the WQ 118 is no longer in use.

Contention refers to the number of SPU 104 that are working on a given WQ 118. Depending on the type of work, there may be a maximum number of SPUs 104 that can work on a given WQ 118. This number may be stored as part of the work definition 116. Certain types of work require two or more SPUs for efficient processing. In such cases, the output of one SPU may be forwarded to a second SPU for further processing. To address such cases, it is useful to define a minimum contention, i.e., a minimum number of SPUs needed to process the work. This number can also be stored as part of the work definition 116. The choice of the value of minimum contention for a particular work queue may depend on the nature of the work within the work queue. For example, task work queues often have interdependencies amongst tasks and may benefit from assignment of more than one SPU to their work. Consequently it may be desirable to set a minimum contention value for a task work queue equal to the total number of SPUs in the cell processor 100, e.g., eight for the system shown in FIG. 1. Job work queues, by contrast, tend to work better if contention for their work is balanced amongst the SPUs 104. Consequently it may be more desirable to set the minimum contention value for a job work queue equal to 1.

Each work queue 118 may be associated with a Policy Module. In the case represented by Table I, the association between a work queue and its corresponding policy module is by way of a pointer to the memory address of a policy module definition 120. A Policy Module may be associated with multiple work queues. Table II illustrates an example of a policy module definition.

TABLE II

| Bytes (12) | Policy Module Definition |
|---|---|
| 4 | Address of Policy Module SPU code image |
| 4 | Size of SPU code image |
| 4 | Code image offset of function that takes Work pointer |

In Table II, the Code image offset refers to the entry point address for the first function call.

By way of example, the policy module definition 120 may include a pointer to a memory address containing the code image 122 of the policy module. It is this code image that is loaded into the local storage 110 by the scheduler program 112. The loaded image then runs the SPE 104 as the policy module 124. The policy module 124 may control the loading of work, e.g., context data 126 in the form of code or data into the local storage 110 from the work queue 118 in main memory 106. The policy module 124 may return control of the SPE 104 to the scheduler program 112 upon a pause or stoppage in execution of a context, whereupon the scheduler program 112 may implement a direct SPE context switch.

FIG. 1B and FIGS. 2A-2C illustrate examples of direct SPE context switches. For example as shown in the flow diagram 200 FIG. 2A and in FIG. 1B, execution of a running thread (CTX 1) resident on a given SPE, e.g., SPE1 104A, may be halted as indicated at 202. SPE1 104A may then perform a direct SPE context switch between CTX 1 and a second Thread (CTX 2) as indicated at 204. The second thread CTX 2 may be resident on the same SPE 104A or on a different SPE, e.g., SPE2 104B. If the second thread CTX 2 is also resident on SPE1 104A, the SPE direct context switch may be performed under the control of a scheduler program 112A that is resident on the SPE 104A. Context data and code associated with the first thread CTX 1 may be moved from one are of the SPE1 local memory 110A to another area. Register values associated with the first thread may be stored in a dedicated area 113A of the local memory 110A. The SPE 104A may then execute Task B. An SPE direct context switch involving switching of two contexts that are resident in the same SPE local memory is referred to herein as an intra-SPE context switch.

If the second thread CTX 2 is resident on a different the SPE direct context switch may involve switching the context of the second thread CTX 2 to SPE2 104B. Such a context switch is referred to herein as an inter-SPE direct context switch. Such a transfer may be desirable e.g., where the only available task for SPE2 104B that is awaiting execution CTX 2, which is waiting on SPE1 104A. This may happen, e.g., if the only thread on SPE2 CTX 3 has paused execution, e.g., as a result of a DMA transfer to or from its local store 110B. In such cases, SPE2 104B may atomically take CTX 2 from SPE1 104A and atomically notify SPE1 104A that the portion of SPE1's local store that held CTX 2 is available for some other thread. The notification may be implemented, e.g., by reserved areas 115A, 115B in the local stores 110A, 110B, or atomic operation on main memory 106. In such situations, the SPE direct context switch may be implemented under the direction of a scheduler program 112B running on SPE2 104B.

In alternative embodiments, the notification may be implemented by other communication channels of the SPE. For example, some SPE configurations include one or more specially reserved registers known as a signal notification registers (SNR). One SPE may use the SNR to interrupt another SPE and take a task from it. Typically, the SNR is not part of the local store but is one of the channels of the SPE. The SPU of an SPE can poll or block on these channels to determine their status. When an SNR event occurs, it has the special ability of causing the execution of the SPU to jump to an interrupt address (e.g., 0x0), where specially designed interrupt code may determine what to do with the interrupt.

The SPE1, SPE2 and the other SPE in the cell processor 100 may consult a task list 117 to determine what other tasks are available on which SPE. The task list 117 may be stored, e.g., in main memory 106 or on a dedicated SPE. The task list may indicate whether a given task is executing or waiting. An SPE with available space in its local store can obtain a waiting task from another SPE using an SPE direct context switch.

In other situations SPE1 104A may temporarily move code and/or data from its own local store to the local store 110B of SPE2 while SPE1 needs extra space for some task. For example, the scheduler program 112A running on SPE1 104A may determine that extra space is needed for execution of CTX 1 and may determine from a status table stored in main memory 106 that SPE2 has space available. The scheduler program could then transfer CTX 2 from SPE1's local store 110A to SPE2's local store 110B. SPE 1 could temporarily store code and/or data from SPE 1's local store 110A in available space in SPE2's local store 110B.

Figure 2A:
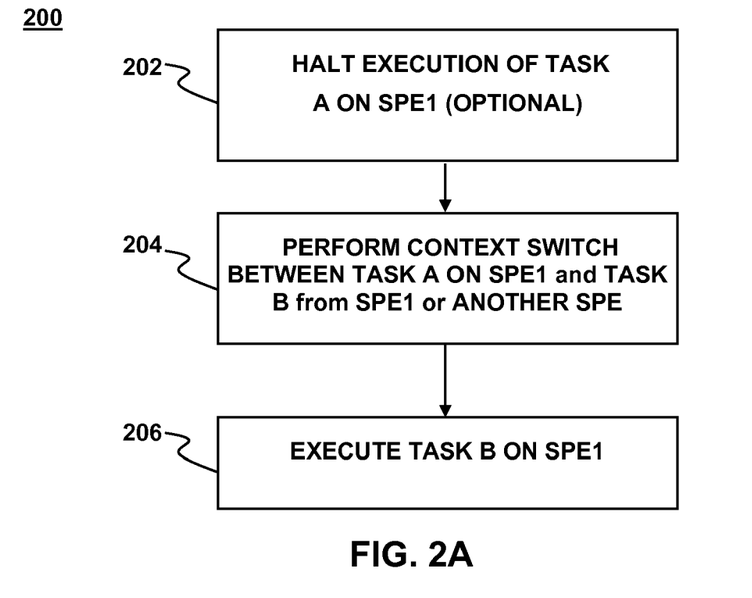
FIG. 2A is a flow diagram illustrating an embodiment of a cell processor method according to an embodiment of the present invention.
Figure 2B:
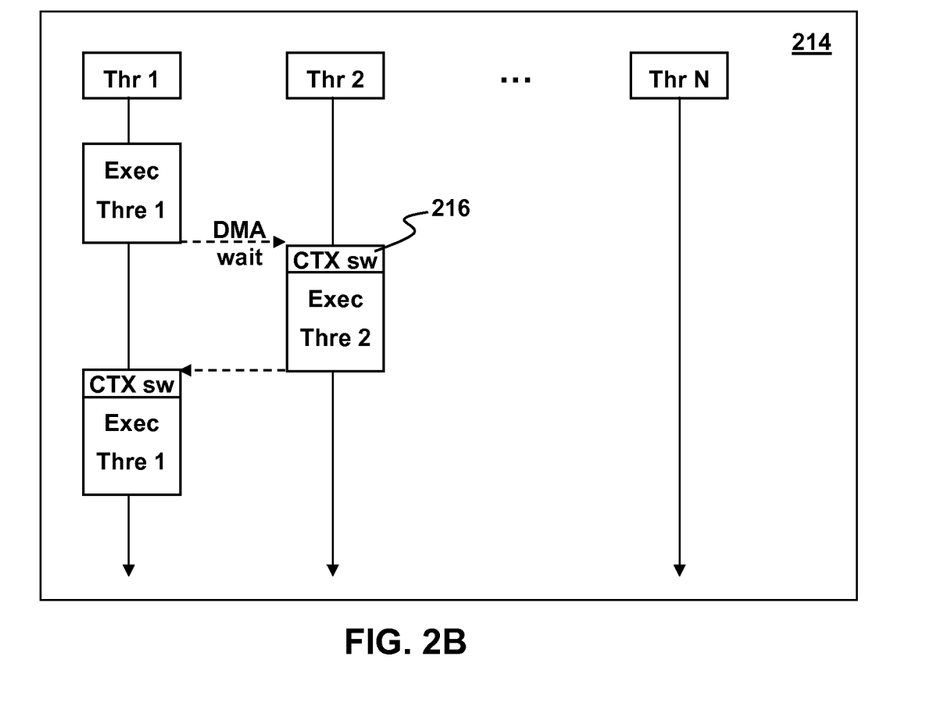
FIG. 2B is a flow diagram illustrating processing of multiple threads in a synergistic processor unit according to an embodiment of the present invention.

A common situation in which SPE direct context switches may be useful arises when a running thread reaches a point in execution where data has to be transferred into or out of the SPE local store 110. Often, execution of the thread must be paused during the data transfer (sometimes called direct memory access or DMA). Although the SPE often cannot execute the paused thread, it could still execute another thread during data DMA. As shown in FIG. 2B, code and/or data for two or more threads Thr1, Thr2 ... ThrN may be stored in the local store of an SPE 214 Execution of a first thread Thr 1 may be interrupted by a DMA wait. During DMA the SPE 214 may perform a SPE direct context switch 216 to a second thread Thr2, which may then execute during DMA on the first thread Thr1. Upon a pause or stoppage of Thr2, the SPE 204 may either: a) resume execution on the first thread Thr1, if DMA is done; or b) look for another thread resident on the SPE 214 and do an intra-SPE direct context switch and execute of that thread; or look for a waiting thread on another SPE and do an inter-SPE direct context switch and execute that thread.

Figure 2C:
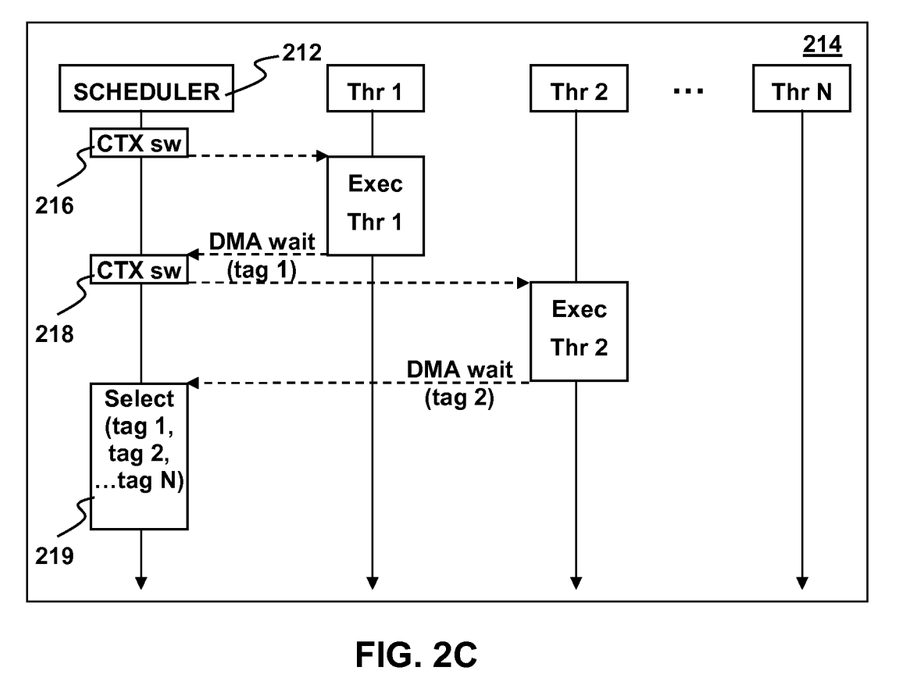
FIG. 2C is a flow diagram illustrating processing of multiple threads and multiple data transfers in a synergistic processor unit according to an embodiment of the present invention.

Situations may arise in which two or more threads that are resident on the same SPE are simultaneously paused as a result of data transfers (e.g., DMA). In such a case it is desirable for the scheduler program running on the SPE to select an available thread from among two or more resident threads. There are a number of different ways that this may be accomplished. For example as illustrated in FIG. 2C, a scheduler program 212 running on an SPE 214 may utilize a mask and a "select" operation to determine which thread is available for execution. Each DMA wait associated with a different thread has an associated tag, e.g., a value between 0 and 15 corresponding to a bit in the mask. The mask includes a plurality of bits with a different bit for each possible DMA tag. Each bit may have a value of "1" or "0" depending on whether the corresponding DMA has been completed or not. By way of example, and without loss of generality, a bit value of 1 may correspond to an ongoing DMA for the corresponding thread and a bit value of 0 may correspond to a completed DMA (or no ongoing DMA) for the corresponding thread. A select operation of the type select(tag1, tag2, ... tagN) may be used select a bit corresponding to a thread having completed DMA or no DMA.

The use of such the mask and select operation may be understood as follows. As in FIG. 2B, the SPE 214 may have code and/or data associated with a plurality of threads Thr1, Thr2 ... ThrN stored in its local memory. The scheduler program 212 may initiate execution of a first thread Thr1, e.g., as a result of a first SPE direct context switch 216.

Execution of the first thread Thr1 may pause during a DMA operation. A DMA first tag is associated with the DMA wait for the first thread Thr1 and the scheduler 212 may perform another SPE direct context switch 216 to a second thread Thr2. Execution of the second thread Thr2 may subsequently pause for another DMA operation. A second DMA tag is associated with the DMA wait for the second thread Thr2. The scheduler 212 then performs a select operation of the type select(tag1, tag2, ... tagN) as indicated at 219 which returns one or more bits corresponding to one or more threads that have either completed DMA or are not undergoing DMA. For example, if DMA has been completed on the first thread Thr1 the scheduler 212 may perform an intra-SPE direct context switch and resume execution of the first thread Thr1. If neither the first thread Thr1 nor the second thread Thr2 has completed its DMA, the scheduler 212 may select a different thread for which there is no ongoing DMA.

Figure 3A:
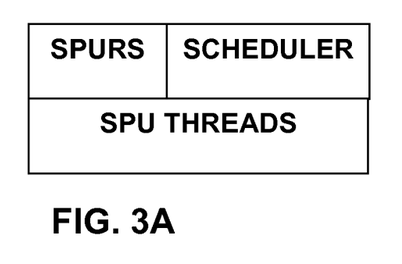
FIGS. 3A-3B are schematic diagrams illustrating software architecture for implementing embodiments of the present invention.

In embodiments of the present invention the scheduler program 112 may be optimized for interoperability. Examples of such interoperability are depicted diagrammatically in FIGS. 3A-3F. For example, the scheduler program 112 may be implemented as a particularly advantageous type of normal SPU thread as depicted in FIG. 3A. As such, a processing system that implements SPMM can interoperate with SPU threads or vice versa. In such an embodiment, SPU Threads can be useful to accommodate rare high priority preemptions. The scheduler program 112 may be implemented as a standalone system, built on top of raw SPUs or SPU Threads (e.g., as defined in the Sony PS3 SDK). In this case, a thread scheduler may runs at the top of SPE local store, and manage the rest of local store for task threads.

Figure 3B:
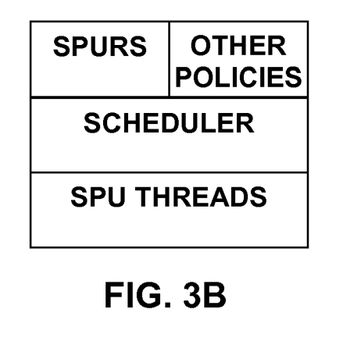

Furthermore, the scheduler program 112 may be implemented in conjunction with SPURS. For example, as depicted in FIG. 3B, SPURS may be implemented as one possible policy module within the context of a SPU policy module manager (SPMM). Such a system is described, e.g., in commonly-assigned U.S. patent application Ser. No. 11/238,077 to John P. Bates et al. filed Sep. 27, 2005, and entitled "CELL PROCESSOR METHODS AND APARATUS", the disclosures of which are incorporated herein by reference. Thus, SPURS can operate on certain tasks where SPMM can replace SPURS code with something else for work on other tasks. SPMM can schedule multiple SPURS tasksets next to other SPU task systems, obeying priorities. Furthermore, it is possible for SPU Threads to implement both SPURS and SPMM as different possible SPU Threads. As such, embodiments of the present invention can be fully interoperable with both SPURS and SPU threads. For example, if implemented on SPURS, the scheduler 112 may be a policy module.

The feature of scheduling across various programming models is important. This feature is especially useful for the Cell processor and other parallel processor devices with similar features.

As may be seen from FIG. 3B, the scheduler program may be incorporated into an SPU Task System such as SPURS. In such a case, the SPU Task System Instance referred to above may be designated a SPURS Instance, i.e., the context of one instantiation of SPURS including an associated SPU Thread Group. The scheduler program 112 may be regarded as part of a SPURS Kernel, e.g., a relatively small amount of binary code that is resident on all SPURS SPU Threads that schedules the Work Queues 118 and loads Policy Modules to the SPU Local Store 110.

Figure 3C:
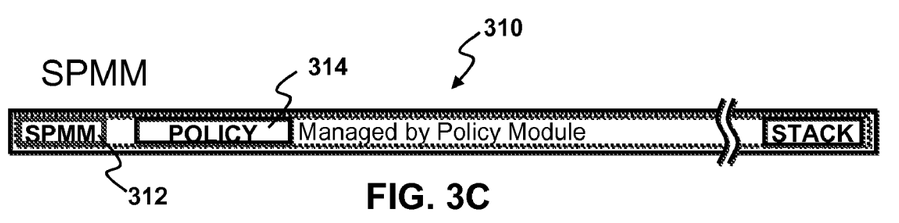
FIGS. 3C-3F are memory maps illustrating implementation of SPMM-based implementation of cell processing according to embodiments of the present invention.
Figure 3D:
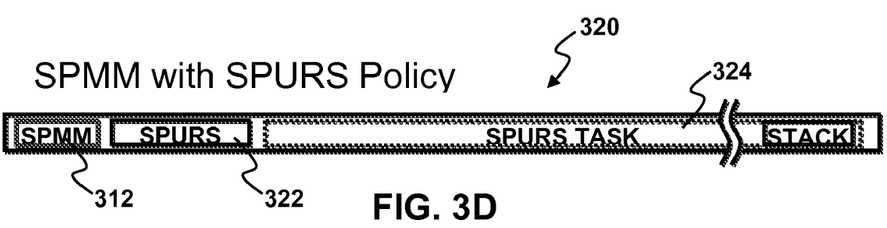

FIGS. 3C-3D depict memory maps for local storage 110 on an SPE implementing different programming models. By way of example, and without limitation, the scheduler program 112 may be implemented as a Policy Module (PM) under SPMM. When any of the tasks are ready, SPMM can load the multi-threaded task scheduler PM, at which point it begins managing the remaining local store for task threads. FIG. 3C depicts a memory map for local storage 310 of an SPU implementing SPMM. Here an SPMM kernel 312 may load a policy 314 containing a scheduler program of the type described above. SPU operation may managed by the policy 314 until completion of work or a pre-empting event occurs. The policy 314 may be a custom policy, i.e., one that is specifically designed for a particular application or class of operations. Developers can create such custom polices to suit particular applications. FIG. 3D depicts a memory map for a local storage 320 in which SPURS 322 is implemented as a policy under SPMM 312. The SPURS policy 322 manages a SPURS taskset 324. SPURS can be modified to run on SPMM with same program start address for SPURS tasks. When running under SPMM 312, the SPURS policy 322 does not need to manage multiple tasksets. As in the other Policy Module examples, the scheduler program described above could be implemented as a small program that gets loaded into Local Store after the SPMM Kernel. The remaining Local Store may then be divided among different Task contexts.

Figure 3E:
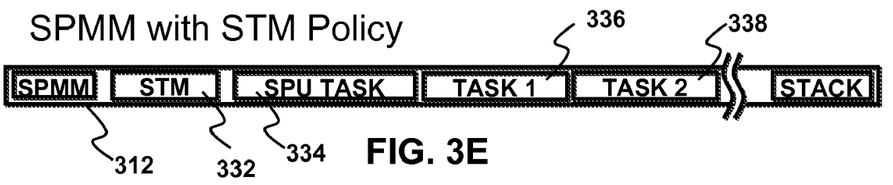

An advantage of SPMM is that SPURS and other policies can be easily swapped in and out as the nature of the work requires. For example, FIG. 3E depicts a memory map for a local storage 320 in which SPU Task Manager (STM) 322 is implemented as a policy under SPMM 312. The STM policy 332 manages a STM taskset having a task code 334 and one or more sets of task data 336, 338 The STM policy 332 reads one or more task definitions stored in the main memory into the local storage 320. Based on information contained in the task definitions the SPU loads code and/or data related to the task definitions from the main memory into the local memory associated with the selected SPU. The selected SPU then performs one or more tasks using the code and/or data. STM can be modified to run on SPMM with same program start address for STM tasks. When running under SPMM 312, the STM policy 332 does not need to manage multiple tasksets. STM is described in detail in commonly-assigned U.S. patent application Ser. No. 11/238,087 entitled "SPU TASK MANAGER FOR CELL PROCESSOR" to John P. Bates, Payton R. White, Richard Stenson, Howard Berkey, Attila Vass and Mark Cerny, which is filed the same day as the present application, the entire disclosures of which are incorporated herein by reference.

Figure 3F:
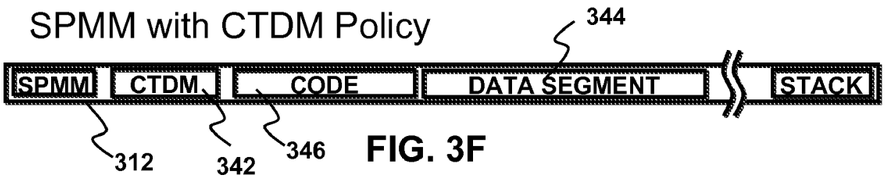

Another possible policy that may be loaded under SPMM and used in conjunction with the scheduler program is known as Cell Processor Task and Data Management (CTDM). FIG. 3F depicts a memory map for a local storage 320 in which CTDM 342 is implemented as a policy under SPMM 312. The CTDM policy 342 allows the SPU to break up sets of data that are too large to fit in the local storage 320 into smaller segments 344 than can be processed by code 346 running on the SPU. The data can also be divided up into groups of a size suitable for processing on a subsequent processor such as a graphics card. CTDM is described in detail in commonly-assigned U.S. patent application Ser. No. 11/238,095 entitled "CELL PROCESSOR TASK AND DATA MANAGEMENT" to Richard B. Stenson and John P. Bates, which is filed the same day as the present application, the entire disclosures of which are incorporated herein by reference.

Embodiments of the present invention are the result of a broad understanding of existing SPU programming models. It is often the case that one model is never perfect for all applications. Consequently, engineers tend to develop custom programming models. Interoperability is not a problem when all the SPU code is written by the same company. However, interoperability can be a problem when middleware is needed that SPU code must interoperate efficiently.

Although much of the above discussion addresses cell processors, embodiments of the present invention may be implemented using any multi-processor scheme. Specifically, embodiments of the invention may be implemented in various configurations of parallel processors. For example, the invention herein may be implemented in a configuration with multiple SPE-like processors elements, but no main or power processor unit (PPU-like processor. The embodiments may be implemented in a parallel processor environment having one or more main processors and more or fewer than eight SPE (or similar processors with local memories). In addition, although processor systems having a significant shared main memory are described herein, embodiments of the present invention may be implemented in processor systems having little or no shared main memory.

Figure 4:
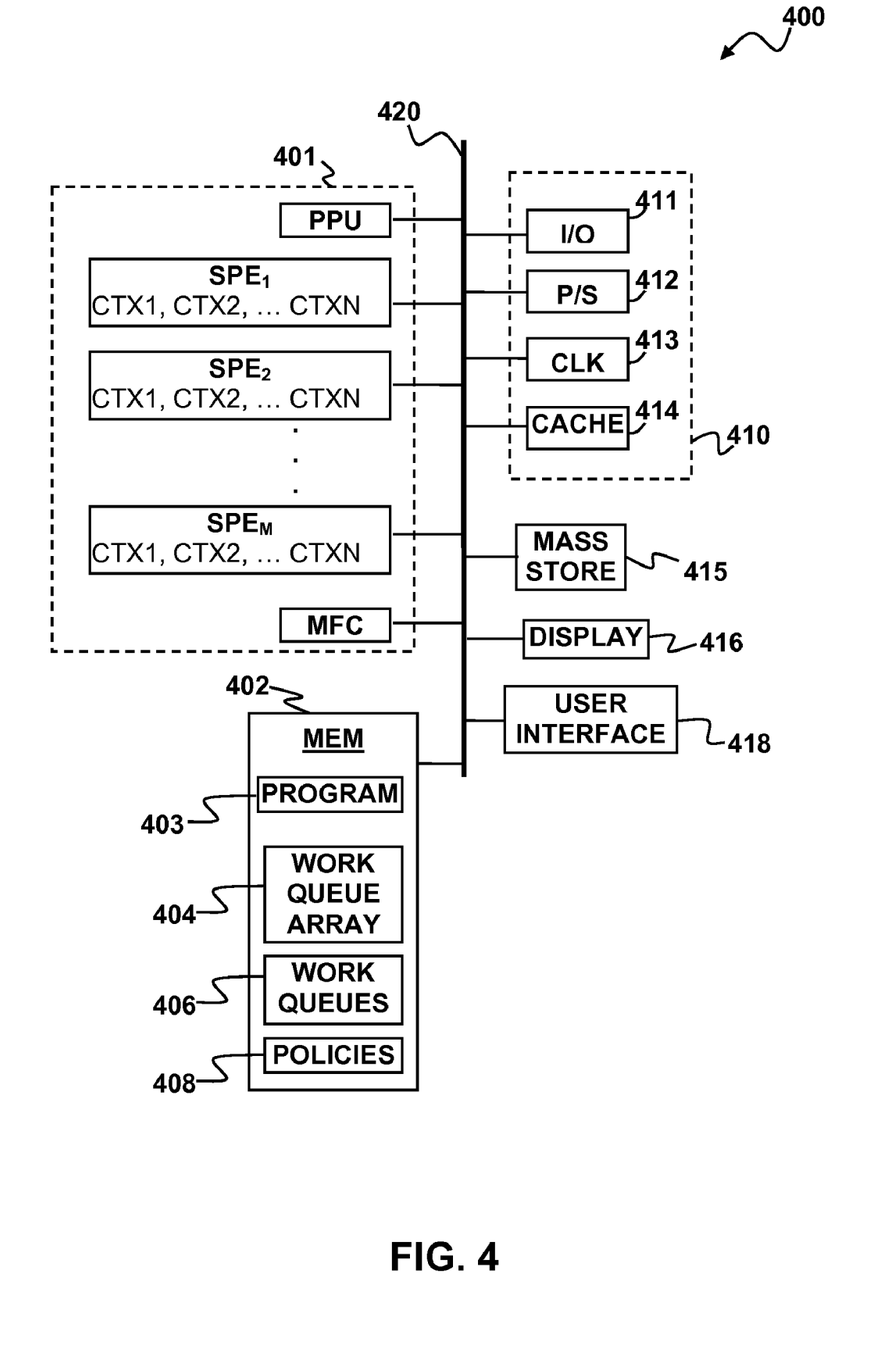
FIG. 4 is a block diagram of a data processing system according to an embodiment of the present invention.

Parallel processor units of the type depicted in FIGS. 1A-1B operating as described above may be implemented as part of a larger processing system 400, as depicted in FIG. 4. The system 400 may include a cell processor module 401 and a memory 402 (e.g., RAM, DRAM, ROM, and the like). In addition, the processing system 400 may have multiple cell processor modules 401. The cell processor module 401 generally includes one or more main processors PPU and one or more SPE $SPE_1$, $SPE_2$ . . . $SPE_M$ each of which may code and/or data associated with two or more threads stored in its local memory. Each SPE may further have a scheduler program stored in its local memory. The scheduler programs may be configured as described above.

The processor module 401 may also include a memory flow controller MFC. The cell processor module 401 may be a cell processor, e.g., of the type depicted in FIG. 1. The memory 402 includes data and code configured as described above. Specifically, the memory includes a work queue array 404, work queues 406 and policy modules 408 each of which may include code, data or some combination of both code and data as described above.

The system 400 may also include well-known support functions 410, such as input/output (I/O) elements 411, power supplies (P/S) 412, a clock (CLK) 413 and cache 414. The system 400 may optionally include a mass storage device 415 such as a disk drive, CD-ROM drive, tape drive, or the like to store programs and/or data. The controller may also optionally include a display unit 416 and user interface unit 418 to facilitate interaction between the controller 400 and a user. The display unit 416 may be in the form of a cathode ray tube (CRT) or flat panel screen that displays text, numerals, graphical symbols or images. The user interface 418 may include a keyboard, mouse, joystick, light pen or other device. The cell processor module 401, memory 402 and other components of the system 400 may exchange signals (e.g., code instructions and data) with each other via a system bus 420 as shown in FIG. 4.

As used herein, the term I/O generally refers to any program, operation or device that transfers data to or from the system 400 and to or from a peripheral device. Every transfer is an output from one device and an input into another. Peripheral devices include input-only devices, such as keyboards and mouses, output-only devices, such as printers as well as devices such as a writable CD-ROM that can act as both an input and an output device. The term "peripheral device" includes external devices, such as a mouse, keyboard, printer, monitor, external Zip drive or scanner as well as internal devices, such as a CD-ROM drive, CD-R drive or internal modem or other peripheral such as a flash memory reader/writer, hard drive.

The processor module 401 may manage the performance of tasks in the work queues 406 in response to data and program code instructions of a main program 403 stored and retrieved by the memory 402 and executed by the processor module 401. Code portions of the program 403 may conform to any one of a number of different programming languages such as Assembly, C++, JAVA or a number of other languages. The processor module 401 forms a general-purpose computer that becomes a specific purpose computer when executing programs such as the program code 403. Although the program code 403 is described herein as being implemented in software and executed upon a general purpose computer, those skilled in the art will realize that the method of task management could alternatively be implemented using hardware such as an application specific integrated circuit (ASIC) or other hardware circuitry. As such, it should be understood that embodiments of the invention can be implemented, in whole or in part, in software, hardware or some combination of both. In one embodiment, among others, the program code 403 may include a set of processor readable instructions that implement a method having features in common with the method 200 of FIG. 2A.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A" or "An" refers to a quantity of one or more of the item following the article, except where expressly stated otherwise. In the claims that follow, the expressions first and second are used to distinguish between different elements and do not imply any particular order or sequence. The appended claims are not to be interpreted as including means-plus-function limitations, unless such a limitation is explicitly recited in a given claim using the phrase "means for."

What is claimed is:

1. In a cell processor having one or more central processors and a plurality of synergistic processing elements (SPE), each SPE in the plurality comprising a synergistic processor unit and a local memory, a method for implementing multiple contexts on one or more SPE in the plurality, the method comprising:
   storing code and/or data for a first context in a first region of the local memory of a first SPE of the plurality;
   storing code and/or data for a second context in a second region of the local memory of the SPE while the code and/or data for first context is resident in the local memory of the first SPE;
   executing the first context with the SPE while the second context waits; and either
   a) transferring the code and/or data for the first context from the first region to the second region and transferring the code and/or data for the second context from the second region to the first region, and executing the second context with the SPE during a pause or stoppage of execution of the first context; or
   b) transferring the code and/or data for the second context to a local memory of a second SPE of the plurality; or
   both a) and b).

2. The method of claim 1 wherein a) further comprises: stopping execution of the first context.

3. The method of claim 1 wherein a) comprises pausing execution of the first context during a transfer of data to or from the local memory of the first SPE associated with the first context.

4. The method of claim 3 wherein a) further comprises: executing the second context with the first SPE during the transfer of data to or from the local memory of the first SPE.

5. The method of claim 4, wherein a) further comprises: resuming execution of the first context with the first SPE after the data transfer to or from the local memory of the first SPE is complete.

6. The method of claim 4, wherein a) further comprises: executing a third context with the first SPE after the data transfer to or from the local memory of the first SPE is complete.

7. The method of claim 4, further comprising: determining whether to resume execution of the first context, the second context or a third context if execution of the second context pauses for a transfer of data to or from the local memory of the first SPE associated with the second context.

8. The method of claim 7, wherein determining whether to resume execution comprises determining whether the transfer of data associated with the first or second context has been completed.

9. The method of claim 8 wherein determining whether the data transfer has been completed comprises:
   associating each of a plurality of data transfers associated with corresponding plurality of contexts resident on the SPE with a corresponding bit of a mask, wherein the plurality of data transfers includes the data transfers associated with the first and second contexts, wherein a value of each bit depends upon whether the corresponding data transfer has been completed; and
   performing a select operation on the mask to determine which, if any, of the plurality the data transfers has been completed.

10. The method of claim 1, further comprising, if b) is implemented, following b) notifying the first SPE that the first region of the local memory is available.

11. The method of claim 10 wherein notifying the first SPE that the first region of the local memory is available includes changing the value of one or more bits in a reserved area of memory in the local memory of the first SPE.

12. The method of claim 10 wherein notifying the first SPE that the first region of the local memory is available includes performing an atomic operation on a reserved area of a main memory that is coupled to the plurality of SPE.

13. The method of claim 1, further comprising: following b) executing the second context with the second SPE.

14. The method of claim 1, further comprising: following b) transferring code and/or data associated with the first context into the second region of the local memory of the first SPE.

15. The method of claim 1, further comprising: following b) transferring code and/or data associated with a third context into the second region of the local memory of the first SPE.

16. In a cell processor having one or more synergistic processing elements (SPE), each SPE comprising a synergistic processor unit and a local memory, a method for implementing multiple threads on a first SPE, the method comprising:
   a) storing code and/or data for a first context in a first region of the local memory of an SPE;
   b) storing code and/or data for a second context in a second region of the local memory of the SPE, wherein storing code and/or data for the first and second contexts comprises: dividing the local memory of the SPE into 2 or more independent sections and a kernel section; loading a scheduler into the kernel section and loading code, data and a stack of a different running thread in each independent section;
   c) executing the first context with the SPE while the second context waits; and
   d) executing the second context with the SPE during a pause or stoppage of execution of the first context.

17. The method of claim 16 wherein a) comprises transferring control of the SPE to the scheduler when a thread loaded into one of the independent sections staffs a data transfer that blocks execution; yielding control of the SPE to the scheduler; and resuming execution of a different thread loaded into another independent section in response to an instruction from the scheduler.

18. The method of claim 16, further comprising, in conjunction with yielding control of the SPE to the scheduler, saving register values associated with the SPE in a reserved area of the local memory.

19. The method of claim 16 wherein the reserved area includes a separate register area for each resident thread in the local memory.

20. The method of claim 16 wherein the scheduler is a policy module.

21. A processor system, comprising:
   one or more synergistic processing elements (SPE), wherein each SPE comprises a processor and a local memory; and
      a scheduler program embodied in the SPE as SPE-executable instructions, wherein the SPE-executable instructions are configured to perform an SPE direct context switch between two or more contexts, wherein the two or more contexts are resident on the same SPE or two different SPE coupled to a data bus, wherein the SPE-executable instructions are configured to perform an SPE direct context switch include either
      instructions that, when executed by the SPE, transfer code and/or data for a first context from a first region of an SPE local memory to a second region of the same local memory, and transfer the code and/or data for a second context from the second region to the first region; or
      instructions that, when executed by the SPE, transfer code and/or data for a first context from a first region of an SPE local memory to a second region of located in a local memory of a different SPE coupled to the data bus.

22. The system of claim 21, further comprising code and/or data corresponding to two or more contexts stored in the local memory of one or more of the SPE.

23. The system of claim 21 wherein the one or more SPE include two or more SPE coupled to a data bus.

24. The system of claim 23, further comprising a power processor unit coupled to the data bus.

25. The system of claim 23, further comprising a main memory coupled to the data bus, wherein the main memory is different from the local memory of an SPE.

26. The system of claim 25 wherein the one or more SPE include two or more SPE coupled to the data bus, and wherein the two or more SPE are configured to share the main memory.

27. The system of claim 25, further comprising a power processor unit coupled to the data bus, wherein the one or more SPE include two or more SPE coupled to the data bus, and wherein power processor unit and the two or more SPE are configured to share the main memory.

28. A computer readable storage medium having embodied therein a set of processor readable instructions embodied therein, the processor readable instructions for implementing a implementing multiple contexts on one or more synergistic processor elements (SPE), wherein each SPE comprises a synergistic processor unit and a local memory:
   a scheduler program embodied as SPE-executable instructions, wherein the SPE-executable instructions are configured to perform an SPE direct context switch between two or more contexts, wherein the two or more contexts comprise two or more contexts resident on the same SPE or two or more contexts resident on different SPE coupled to a data bus, wherein the SPE-executable instructions are configured to perform an SPE direct context switch include either
   instructions that, when executed by the SPE, transfer code and/or data for a first context from a first region of an SPE local memory to a second region of the same local memory, and transfer the code and/or data for a second context from the second region to the first region; or
   instructions that, when executed by the SPE, transfer code and/or data for a first context from a first region of an SPE local memory to a second region of located in a local memory of a different SPE coupled to the data bus.

* * * * *